(12) United States Patent
Baisley (10) Patent No.: US 6,275,787 B1
(45) Date of Patent: Aug. 14, 2001

(54) METHOD FOR MERGING REPOSITORY UPDATES WITH INCOMPLETE WORK IN PROGRESS

(75) Inventor: Donald Edward Baisley, Laguna Hills, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/172,569

(22) Filed: Oct. 14, 1998

(51) Int. Cl.$^7$ .............................. G06F 13/00; G06F 15/16
(52) U.S. Cl. .................... 703/22; 703/27; 707/8; 707/104; 707/203; 709/1; 711/168
(58) Field of Search ................... 703/22, 27, 28; 707/7, 8, 10, 102, 104, 203; 705/64; 709/106, 1; 711/168

(56) References Cited

U.S. PATENT DOCUMENTS

| | | | |
|---|---|---|---|
| 5,724,556 | * 3/1998 | Souder et al. | ................ 395/500 |
| 5,913,061 | * 6/1999 | Gupta et al. | ................ 395/680 |
| 5,966,707 | * 10/1999 | Van Huben et al. | ............. 707/10 |
| 5,978,811 | * 11/1999 | Smiley | ........................... 707/103 |
| 6,035,297 | * 3/2000 | Van Huben et al. | .............. 707/8 |

\* cited by examiner

Primary Examiner—Kevin J. Teska
Assistant Examiner—Thai Phan
(74) Attorney, Agent, or Firm—Alfred W. Kozak; Mark T. Starr; Lise A. Rode (57) ABSTRACT

In a computing system executing a repository program, a computer-implemented method is disclosed for merging updates to models stored in the repository with a user's incomplete work-in-progress currently being executed by the computer system. Once a repository transaction is begun, for each package within a model that is checked out by the user, a check-in operation is performed. The model is extracted for use by a modeling tool and the repository transaction is aborted, thereby undoing the check-in but leaving the extracted model intact for use by the modeling tool. A report may be generated of any inconsistencies between the model and modeling rules imposed by the check-in operation of the repository.

8 Claims, 7 Drawing Sheets

METHOD FOR MERGING REPOSITORY UPDATES WITH INCOMPLETE WORK IN PROGRESS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED APPLICATIONS

This patent document relates to the following co-pending applications, assigned to the same assignee hereof, which are incorporated herein by reference.

U.S. Ser. No. 09/154,613, entitled A METHOD AND SYSTEM FOR MONITORING AND CAPTURING ALL FILE USAGE OF A SOFTWARE TOOL;

U.S. Ser. No. 09/156,029, entitled A METHOD AND SYSTEM FOR INTERFACING TO A VARIETY OF SOFTWARE DEVELOPMENT TOOLS;

U.S. Ser. No. 09/156,028, entitled A SOFTWARE SYSTEM DEVELOPMENT FRAMEWORK;

U.S. Ser. No. 09/156,027, entitled A METHOD AND SYSTEM FOR CONTROLLING AND TRACKING CLIENT ACCESS TO SERVER SOFTWARE; and, U.S. Ser. No. 09/156,026, entitled A METHOD AND SYSTEM FOR BUILDING COMPONENTS IN A FRAMEWORK USEFUL IN DEVELOPING INTEGRATED BUSINESS-CENTRIC APPLICATIONS.

FIELD OF THE INVENTION

The present invention generally relates to the field of computer systems for developing business applications; and, in particular, it relates to a method for merging repository updates with incomplete work-in-progress currently being executed by the computer system.

BACKGROUND OF THE INVENTION

Prior art methods for merging work in progress with checked-in changes require numerous steps and a great deal of complexity in order to take into account the myriad details involved in the type of object model being merged. Such methods vary from one type of model to another. For example, Unified Modeling Language (UML) models require different steps than Metaobject Facility (MOF) models.

Information stored in an object-oriented repository often consists of large composite objects containing other composite objects. For example, a body of information expressed using UML consists of a model containing various detailed model elements and any number of packages. Each package can further contain various detailed model elements as well as additional packages.

In addition to the composite relationships within the model, there are many relationships between elements, and these relationships commonly cross package boundaries. For example, an attribute of a classifier in one package can have a type in another package. Or a generalization can refer to a supertype in a different package. For this reason, when a user wants to modify a single package using a UML modeling tool, he loads the entire model containing the package into the tool. This allows him to see and modify references in the package to elements outside the package.

The problem arises for a repository providing the ability for separate users to check out different packages within the same model. When multiple users check packages in and out of the same model at different points in time, the need sometimes arises for a user with a checked-out package to synchronize his work in progress with changes in other packages that were checked in after he checked out his package. He must do so in order to account for changes in the surrounding packages.

An example scenario could be as follows. Users X and Y are developing a model M, which contains packages P1 and P2. User X checks out package P1 and loads model M into his modeling tool. User Y checks out package P2 and loads model M into his modeling tool. Users X and Y change packages P1 and P2, respectively. User Y checks in his changes to package P2, which include a new class called C. User X needs to use class C in order to complete his changes to package P1. User X must merge his work in progress with the model changes user Y has checked into the repository. User X cannot yet check in changes made to his package P1 because they are incomplete and inconsistent. Moreover, he cannot complete his work and make package P1 consistent until he can merge the new package P2 into the model in his tool.

SUMMARY OF THE INVENTION

Accordingly, it is an object of the present invention to provide a method that allows a user to merge other users' completed work, which they have checked back into a repository, with his own incomplete work in progress.

Another object of the present invention is to provide a method for a user to obtain a report of inconsistencies in his own incomplete work in progress with respect to other users' model changes that have been checked into a repository.

The method of the present invention uses few steps, while employing standard repository features in unusual and unexpected ways as will be shown hereinafter. This method uses a standard check-in operation, but does not actually check in anything. It verifies work as if committing a transaction, but with no intention of committing. It aborts its transaction as if failing, but succeeds in getting the desired extracted model.

An important feature of this invention is the use of few programming steps, which can therefore be implemented with little programming time and effort.

Further, by using whatever check-in and extraction methods the repository supports, the method implicitly works for any type of extraction format or tool. The method is independent of modeling details, so it can be easily adapted to any type of model (UML, MOF, etc.).

Another important feature of this invention is derived from its reuse of the package check-in and model extraction operations. The reuse of these operations guarantees the merge operation will behave consistently with normal check-in and extract operations. Additionally, using the same verify operation used for committing repository transactions guarantees the merge operation gives the same diagnostic messages as an actual check-in.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

A feature of a database is a transaction. A transaction provides boundaries around modifications to a database's persistently stored objects such that a group of changes are made in isolation from other uses of the database and then either committed as a whole or aborted. If committed, all modifications become visible to other users of the database together. If aborted, the modifications are removed and never appear to other users.

An object-oriented database system can enforce constraints on the objects stored in it. A constraint is a restriction on properties of objects. An example of a constraint is a requirement that a property have a value, such as requiring an account object to reference a customer object. Upon committing a transaction, the database system checks all constraints for all objects modified by the transaction. The system does not commit the transaction if a constraint is violated. An operation that checks an object for the purpose of enforcing constraints is herein called a "verify" operation. A "verify" operation produces an error notification for any constraint violation.

Figure 1:
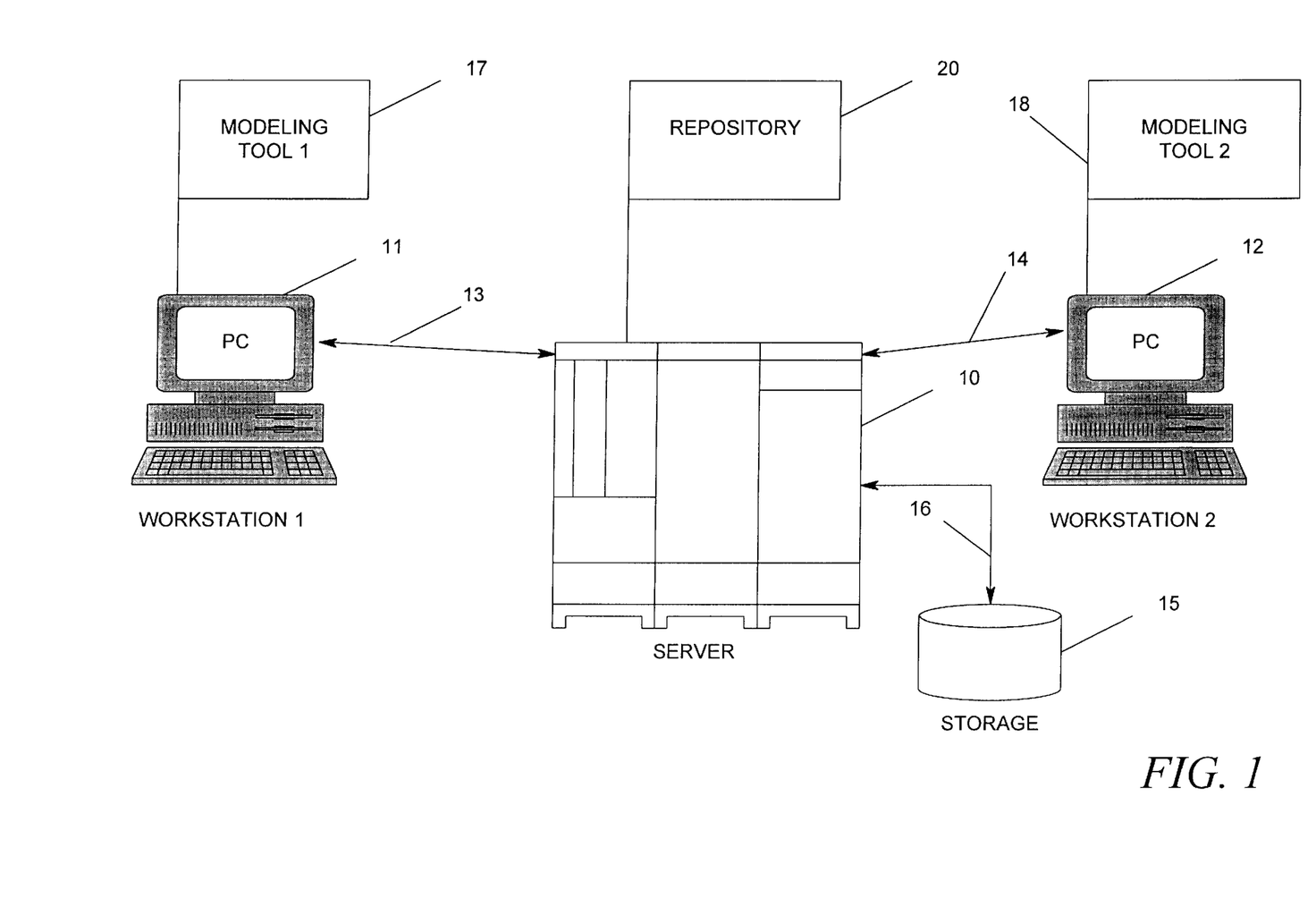
FIG. 1 is a block diagram of a computer system framework that may employ the method of the present invention.

Referring now to the drawings, and FIG. 1 in particular, a server computing system 10 is illustrated with a workstation 1 (such as PC 11) and a workstation 2 (such as PC 12) coupled thereto by means of network connections 13 and 14, respectively. It is pointed out that many more workstations may also be coupled to the server 10. The server 10 may also include a storage 15 coupled in a conventional manner by means of cabling 16. The storage 15 may be used for storing data useful to the programs being run in the workstations and the server itself. The workstation 1 is executing a modeling tool 1 software package 17 while the workstation 2 is executing a modeling tool 2 software package 18. Moreover, the server 10 is executing a repository software package 20.

In the disclosed embodiment, the repository 20 is a specialized, extensible object-oriented database application that adds value to a database system, which allows customization of a particular domain (such as application development).

The repository 20 further includes tools for cataloging, browsing, and managing components that make up an application. Methods to support these services are disclosed in several patents and patent applications assigned to the assignee of this application, including U.S. Pat. No. 5,671,398 for a METHOD FOR COLLAPSING A VERSION TREE WHICH DEPICTS A HISTORY OF SYSTEM DATA AND PROCESSES FOR AN ENTERPRISE; U.S. Pat. No. 5,644,764 for a METHOD FOR SUPPORTING OBJECT MODELING IN A REPOSITORY; U.S. Pat. No. 5,581,755 for a METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073, for A METHOD FOR PACKING/ UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

As will be explained in greater detail hereinbelow, the workstations executing the modeling tools 17 and 18 access the repository program 20 being executed by the server 10 and data stored in the storage 15. The repository may contain a variety of models that may be "checked out" by users of the workstations for revisions or updating as required. In a repository, a "check out" operation on an object, such as a Model Package, reserves to that user the right to make changes to that object or its contents. Other users can see and use the object, but only the user that has checked out the object can "check in" a changed version of it. A "check in" operation on an object, such as a Model Package, puts a new changed version of the object into the repository, and optionally, removes the user's reservation on making changes.

Referring now to FIGS. 2A through 2E, a series of software module block diagrams illustrate the sequence of changes being made to Model Packages which make use of the process of the present invention. Beginning with FIG. 2A, the repository 20 is shown with a Model: Version N, which includes a Package 1 and a Package 2. Packages 1 and 2 include a multiplicity of references or interdependencies, which are depicted by arrows 22 and 23. Moreover, as illustrated in this example, Package 1 is checked out to User 1 and Package 2 is checked out to User 2. Also, as illustrated in the repository 20, there exist previous versions of the Model: Version N−1 and N−2.

Figure 2A:
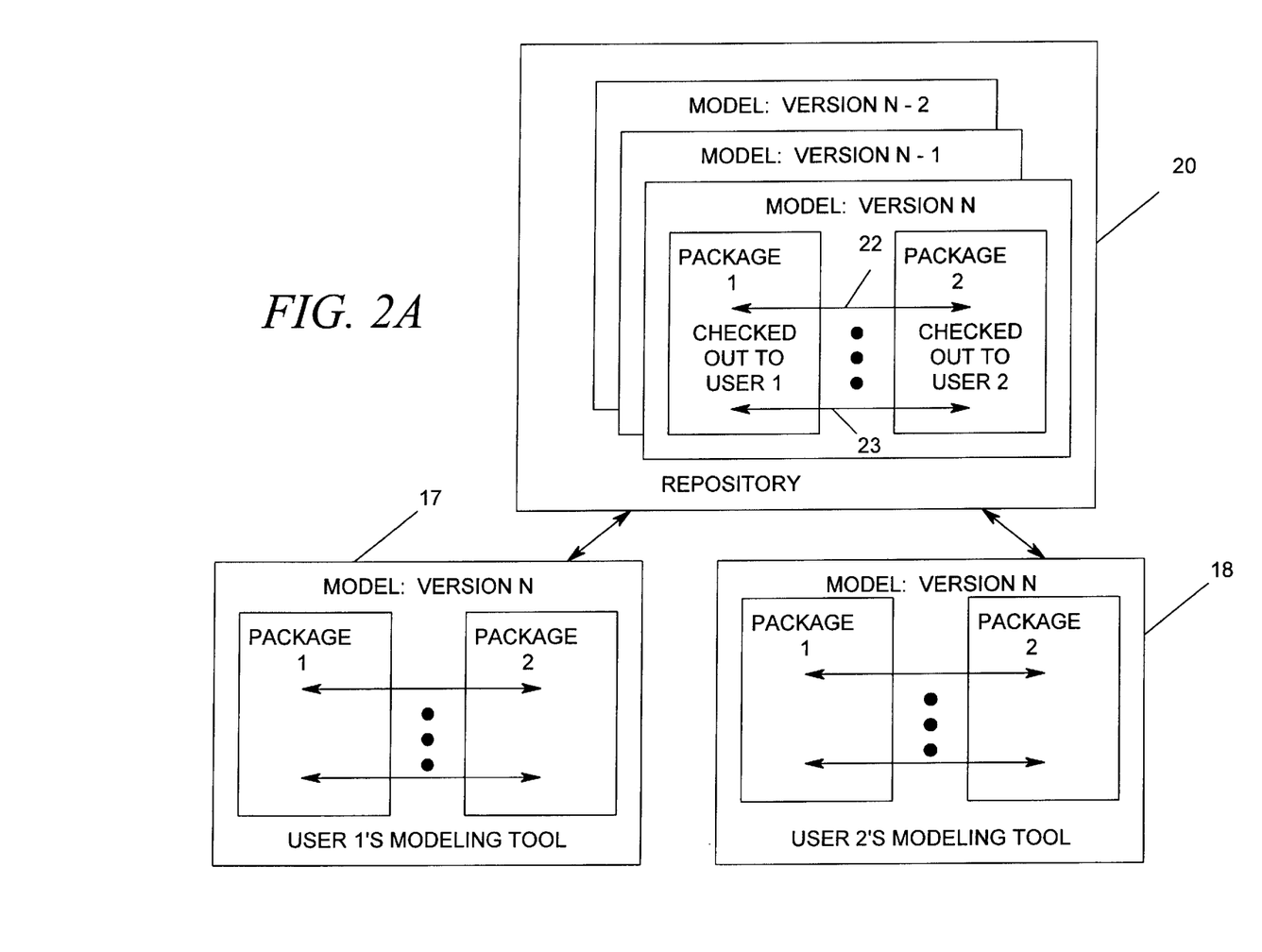
FIGS. 2A through 2E are a series of software module block diagrams illustrating a situation requiring use of the method of the present invention.

The Model: Version N is loaded into modeling tool 17 of the workstation 11 where the user 1 is able to modify Package 1 in the context of the entire Model: Version N and change Package 1's references to elements elsewhere in the model, such as to elements in the Package 2. In a like manner, the Model: Version N is loaded into modeling tool 18 within the workstation 12 where the user 2 is able to modify Package 2 and its references to the Package 1.

Figure 2B:
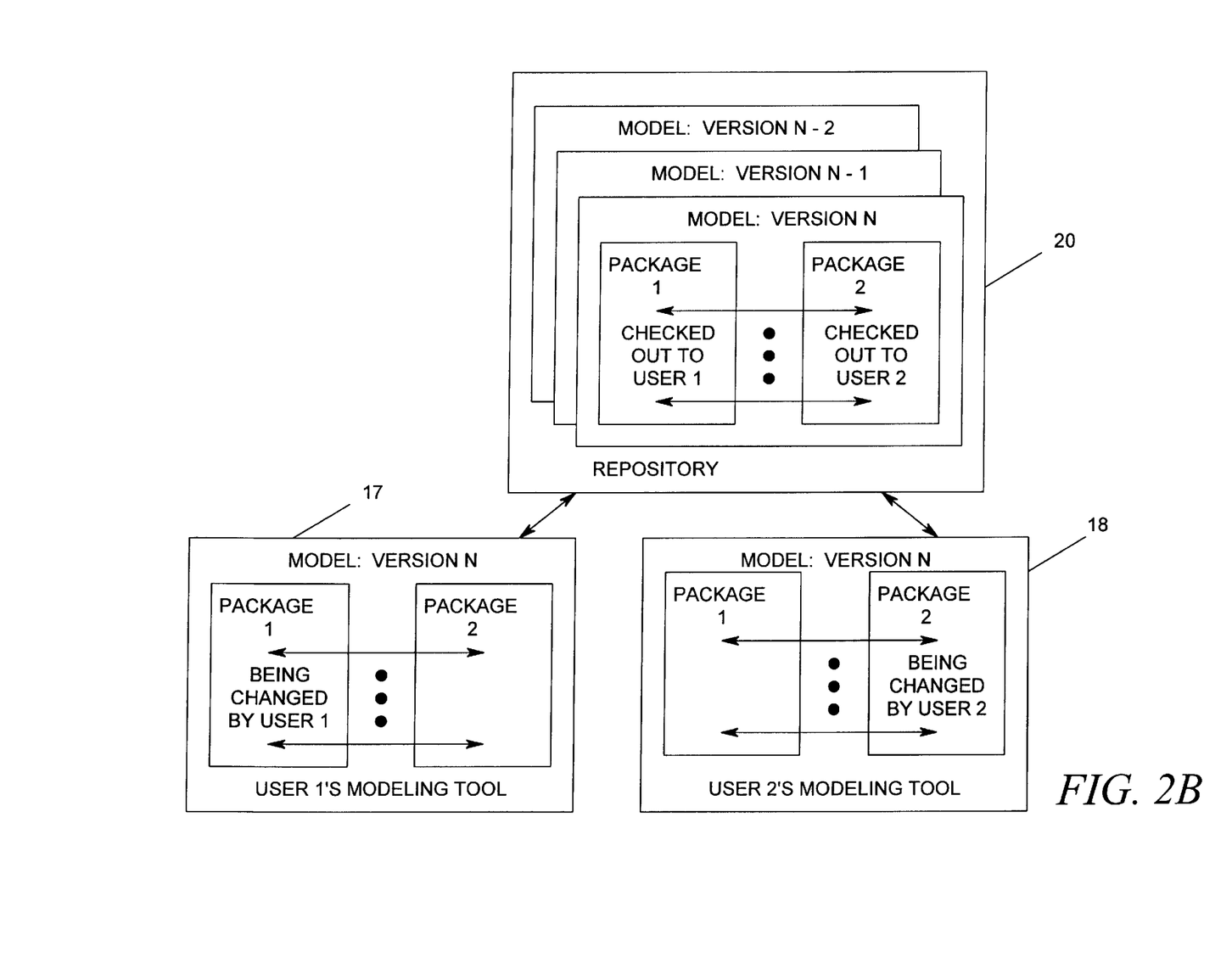

As illustrated in FIG. 2B, user 1 is making changes to Package 1, including Package 1's references to elements of Package 2, and user 2 is making changes to Package 2, including its references to elements of Package 1.

Figure 2C:
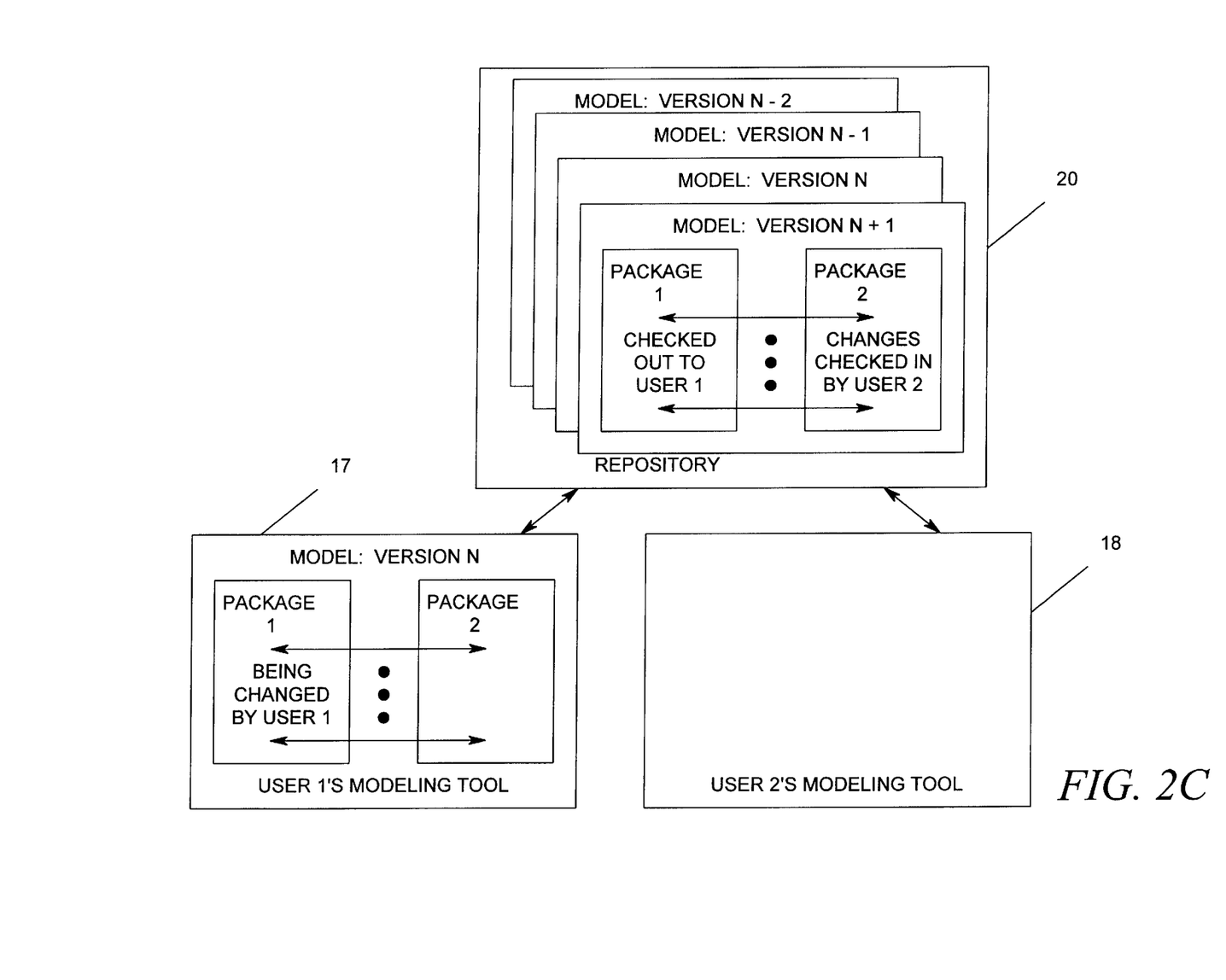

As illustrated in FIG. 2C, user 1 is still making changes to the Package 1, but user 2 has checked in the Package 2 with changes made thereto. Model: Version N+1 contains the Package 1 from Model: Version N, the changed Package 2, and any changed references and interdependencies between the two Packages resulting from the changes to Package 2. User 1 has access to the Package 2, but without benefit of the changes made by user 2. A problem now arises when the user 1 needs access to the changes made to the Package 2 by user 2, but has not completed necessary changes to the Package 1. The user 1 cannot simply load the Package 2 from Model: Version N+1 in the repository because loading the Package 2 by itself would loose its references and interdependencies with the Package 1. The user 1 cannot load the entire Model: Version N+1 from the repository without overwriting and destroying his work in progress on the Package 1. The user 1 cannot check in the Package 1 in order to then load the entire Model containing all changes since the changed Package 1 is incomplete and would therefore be rejected by the repository.

Figure 2D:
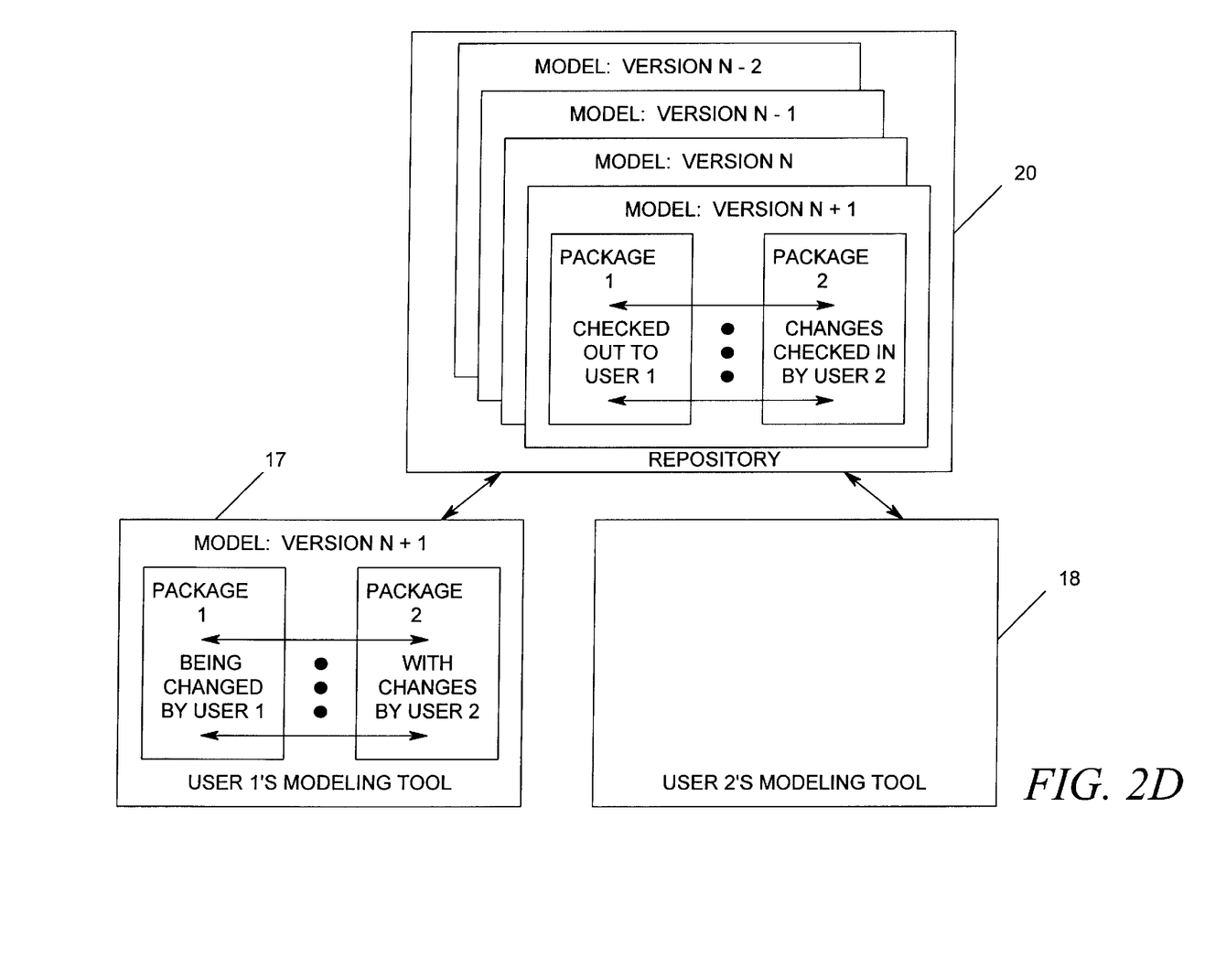

In accordance with a principle feature of the present invention, the user 1 merges his work in progress on the Package 1 with the repository's Model: Version N+1 (including changes by the user 2) as shown in FIG. 2D. The modeling tool 1 then contains the Model: Version N+1 merged with the changes of the user 1 to the Package 1, and all valid references and interdependencies between the Packages 1 and 2 are updated to reflect changes to both. The user 1 also has a report of errors in the changed Package 1 with respect to the Model: Version N+1 showing any invalid references or missing references that are required by the repository.

Figure 2E:
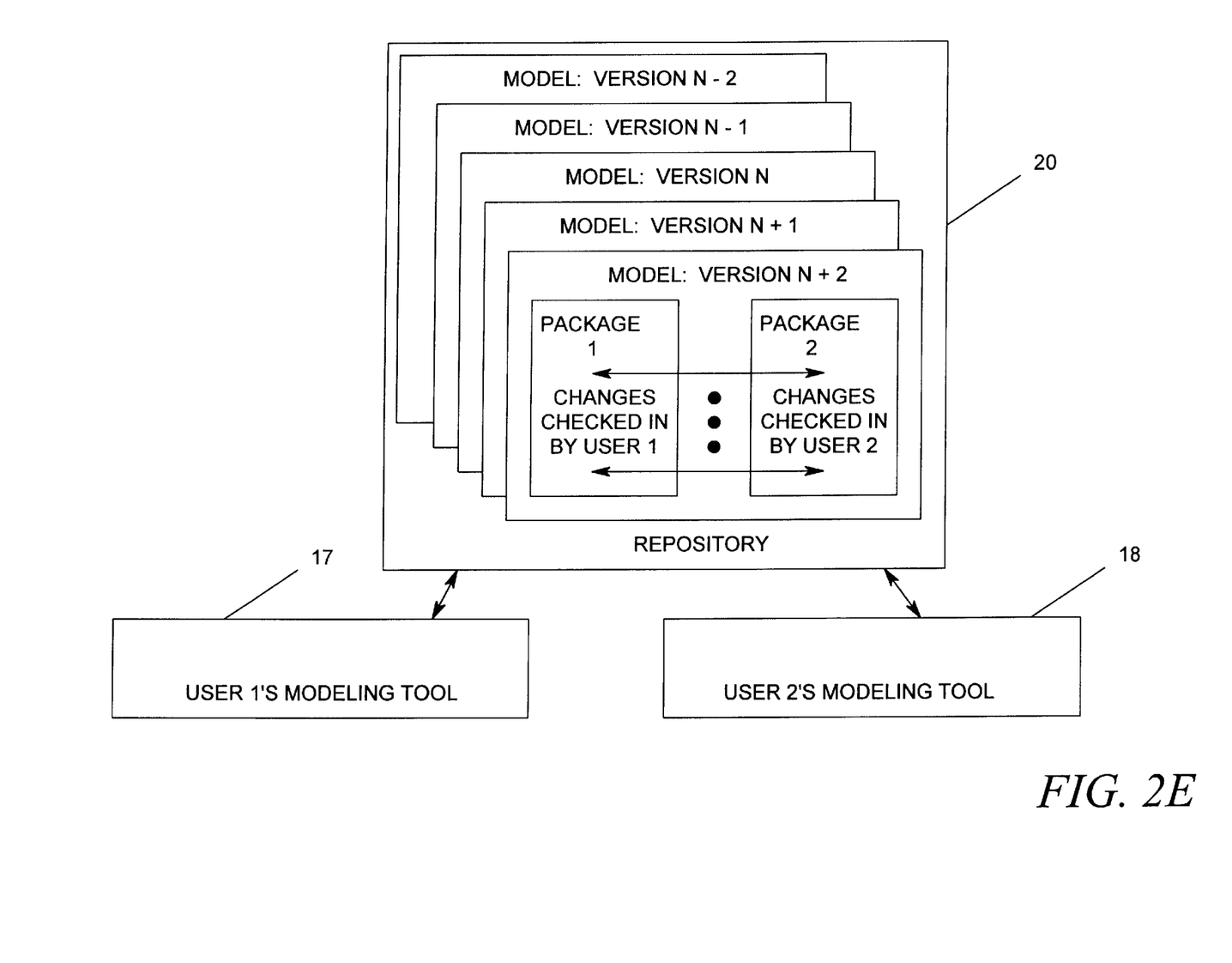

After the user 1 makes all the required changes to the Package 1, then it is checked back into the repository as illustrated in FIG. 2E.

The scenario illustrated in FIGS. 2A through 2E and described hereinabove is a simple example of an application of the present invention. The invention is equally applicable to situations involving any number of models in a repository, any number of packages per model, any number of other users with workstations and modeling tools changing, adding and removing any number of packages. In a like manner, user 1 can check out any number of packages and use the merge operation any number of times before checking in changes.

Figure 3:
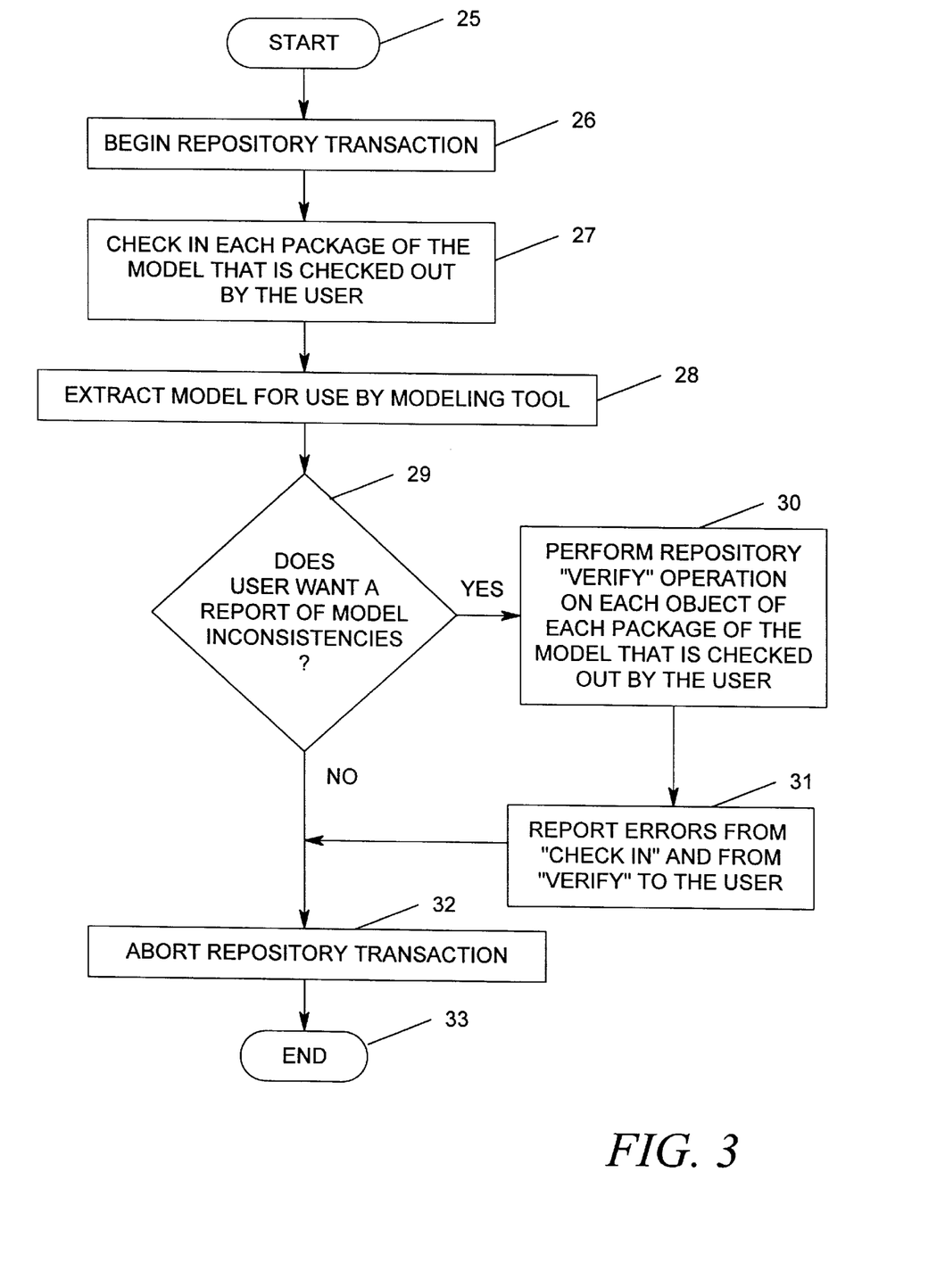
FIG. 3 is a flow chart of the process of the present invention.

For a detailed description of the steps of the process of the present invention, reference is made to the flow chart in FIG. 3. The process is invoked by a user to merge updates that have occurred in a Model in a repository with work in progress in the user's modeling tool. The process begins with a start bubble 25 followed by a step of beginning a repository transaction (block 26). Next, each Package of the Model that is checked out by the user is checked in (block 27). The Model is then extracted for use by a modeling tool (block 28). After this, an inquiry is made as to whether or not the user wants a report of Model inconsistencies (diamond 29). If the answer to this inquiry is yes, then a procedure is performed in the repository 20 to call a "verify" operation on each object of each Package of the Model that is checked out by the user (block 30). Any errors from "check in" and from "verify" are then reported to the user (block 31). Next, the user aborts the repository transaction (block 32) which causes the "check in" operation (block 27) to be undone, but leaves the extracted model (block 28) available to a modeling tool. Finally, the process ends (bubble 33).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A program storage medium readable by a computing system having a storage device, said storage medium tangibly embodying a program of instructions executable by said system to perform method steps for merging repository updates with incomplete work-in-progress currently being executed by the computer system, said method comprising the steps of:
    a. beginning a repository transaction;
    b. for each package within a model that is checked out by said user, performing a standard check-in operation so as to merge said user's updates with updates previously checked in, but without committing said transaction so that results of said check-in operation remain invisible to other users;
    c. extracting said model for use by a modeling tool;
    d. verifying work on said model as if committing a transaction, but with no intention of committing;
    e. aborting said repository transaction, thereby undoing said check-in but leaving said extracted model intact for use by said modeling tool; and,
    f. generating a report of any inconsistencies between said model and modeling rules imposed by the check-in operation of said repository including the steps of:
        1) collecting all errors reported by said check-in operation; and,
        2) just before the step of aborting said repository transaction, for each package within said model that is checked out by said user, performing a repository "verify" operation on each element of said package.

2. The method as in claim 1, further comprising the step of reporting any errors produced from said repository "verify" operation to said user.

3. The method as in claim 2, further including the step of determining whether or not a report is required of any inconsistencies between said model and modeling rules imposed by the check-in operation of said repository.

4. In a computing system executing an object-oriented universal repository program, a method being executed by said system for merging updates to models stored in said repository with a user's incomplete work-in-progress currently being executed by the computer system, said method comprising the steps of:
    a. beginning a repository transaction;
    b. for each package within a model that is checked out by said user, performing a standard check-in operation so as to merge said user's updates with updates previously checked in, but without committing said transaction so that results of said check-in operation remain invisible to other users;
    c. extracting said model for use by a modeling tool;
    d. verifying work on said model as if committing a transaction, but with no intention of committing; and,
    e. aborting said repository transaction, thereby undoing said check-in while leaving said extracted model intact for use by said modeling tool.

5. The method as in claim 4, further comprising the step of reporting any errors produced from said repository "verify" operation to said user.

6. The method as in claim 5, further including the step of determining whether or not a report is required of any inconsistencies between said model and modeling rules imposed by the check-in operation of said repository.

7. The method as in claim 6, where generation of said report is required, further comprising the steps of:
    a. collecting all errors reported by said check-in operation;
    b. just before the step of aborting said repository transaction, for each package within said model that is checked out by said user, performing a repository "verify" operation on each element of said package.

8. The method as in claim 7 further including the step of reporting any errors produced from said repository "verify" operation to said user.

* * * * *